Figure 1:
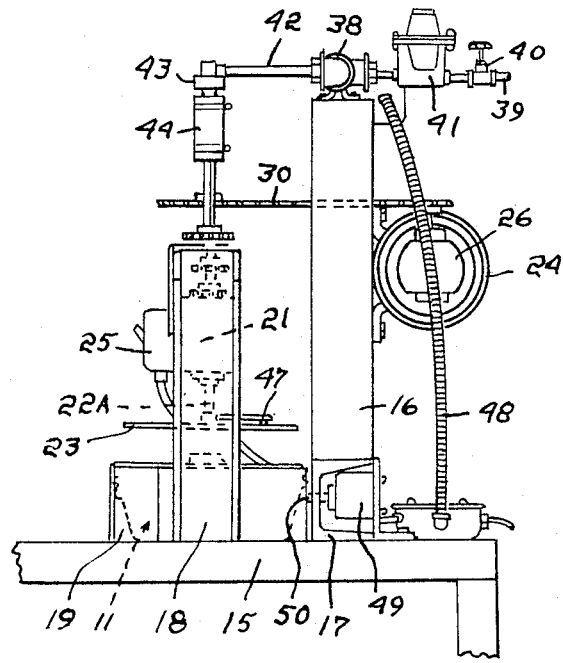

Sept. 13, 1966  L. G. VOGEL ET AL  3,272,361
APPARATUS FOR USE IN FREEING BAKERY PRODUCTS FROM THEIR PANS Filed March 5, 1965  2 Sheets-Sheet 1

INVENTORS
LEO G. VOGEL
RALPH J. HURSTY
BY
ATTORNEY

INVENTORS
LEO G. VOGEL
RALPH J. HURSTY
BY

ATTORNEY

United States Patent Office 3,272,361
Patented Sept. 13, 1966

3,272,361
APPARATUS FOR USE IN FREEING BAKERY PRODUCTS FROM THEIR PANS
Leo G. Vogel, Falmouth Foreside, Maine, and Ralph J. Hursty, South Hamilton, Mass., assignors to V.H.K. Corporation, South Portland, Maine, a corporation of Maine
Filed Mar. 5, 1965, Ser. No. 437,399
17 Claims. (Cl. 214—310)

The present invention relates to apparatus for use in releasing a bakery product from the pan in which it was baked.

The removal of bakery products from their pans is difficult in the case of cakes, particularly sponge cakes. Because of their texture, such cakes cannot be removed by inverting their pans and then jarring the cakes free unless the seam or seams between the cakes and their pan has been released manually. This procedure is slow and results in some cake loss due to breakage and heavy loss due to the damage to pans incidental to the jarring of the cakes to dislodge them.

The present invention, accordingly, has as its principal objective, the provision of means for opening the seams between bakery products and their pans in a manner enabling them to be removed therefrom quickly and easily while ensuring the maintenance of sanitation standards.

In accordance with the invention, this objective is attained by providing a first support provided with air jet establishing means in communication with a source of air under pressure and a second support for positioning the pan in a predetermined position with the seam defined by the junction of the side of the baking product and the side of the pan in the path of air delivered through the jet establishing means. Means connected to one of the supports is operable to turn it so as to effect relative movement between the jet establishing means and the pan for substantially the full length of the seam. The product is sufficiently close to the jet establishing means and the pressure delivered thereby is such that the seam is opened on such relative movement and the product is freed from the bottom of its pan at least when the full length of the seam has been subjected to the opening action of the air delivered by the jet establishing means.

When the cake is in a circular pan, the relative movement between the pan and the jet establishing means is rotary. When the pan is of the type having a central post establishing a central hole in the cake, the jet establishing means has a nozzle for use in opening the seam between the side of the product and the side of the pan and a nozzle for use in opening the seam between the side of the product and the post.

Another objective of the invention is to provide apparatus in which the jet or jets are of sufficient force to free the seam or seams and to lift the cake or that portion thereof in the zone of jet application away from the bottom of the pan together with means to so limit such movement as to prevent injury to the cake as a result thereof.

Another objective of the invention is to provide apparatus in which the support carrying the jet establishing means is continuously rotated and the air supply includes a control normally blocking the flow of air thereto unless the pan is in a predetermined position relative thereto.

In the accompanying drawings, there is shown an illustrative embodiment of the invention from which these and other of its objectives, novel features, and advantages will be apparent.

Figure 4:
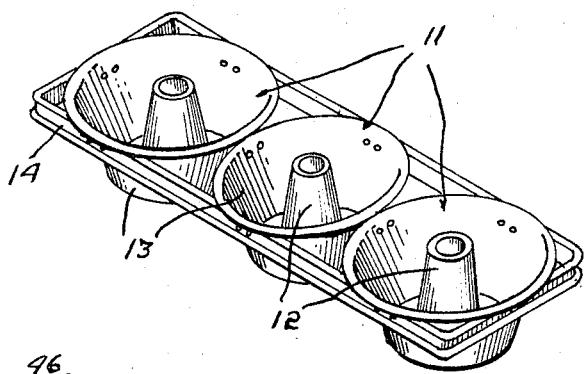
Figure 2:
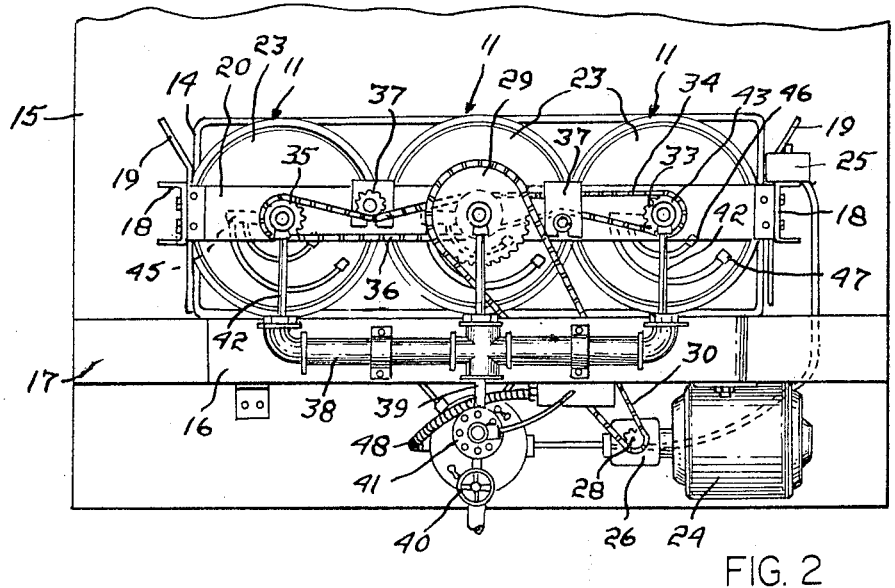
Figure 3:
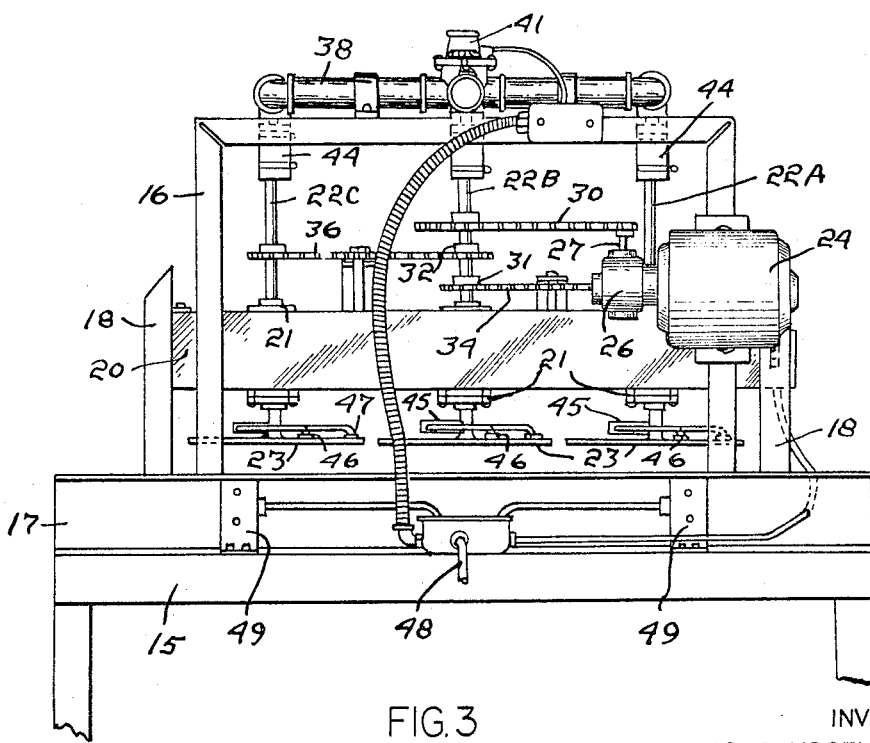

In the drawings:
FIGURE 1 is an end view of the apparatus,
FIGURE 2 is a top plan view thereof,
FIGURE 3 is a rear elevation of the apparatus,
FIGURE 4 is a perspective view of a pan assembly, and
FIGURE 5 is a vertical section through one of the pans and the cake baked therein illustrating the release thereof.

Figure 5:
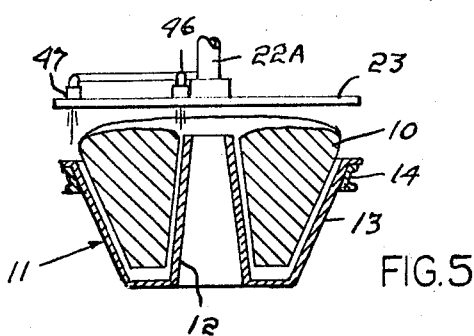

The apparatus illustrated by the drawings is especially designed for use in removing such cakes as the sponge cake 10, see FIGURE 5, from their pans. The pans are generally indicated at 11 and are shown as circular and of the type having a central upwardly and inwardly tapering tubular post 12 and an upwardly and outwardly inclined outer wall 13. In practice, see FIGURE 4, three such pans 11 are often attached to a rectangular frame 14 to facilitate various baking operations.

The apparatus includes a table-like support 15 provided with a transverse, vertical frame 16 and the bottom frame member 17 which is shown as U-shaped in cross section and disposed with its channel opening rearwardly of the support 15. Forwardly of the frame 16, there is a pair of spaced uprights 18 each provided with a guide plate 19. The guide plates 19 are spaced and arranged to permit the frame 14 and its pans 11 to be slid therebetween on the support 15 to bring the leading side of the pan frame 14 against the front face of the frame member 17.

The uprights 18 are interconnected adjacent their upper ends by a member 20 to which bearing assemblies 21 are attached, one bearing assembly for each of the vertical, hollow shafts 22A, 22B, and 22C. The lower end of each shaft is closed by a circular plate 23 the diameter of which is shown as approximately equal to that of the pans 11. The plates 23 are spaced and arranged so that each is above and concentric with an appropriate one of the pans 11 when the leading side of the pan frame 14 is seated against the member 17.

An electric motor 24 is mounted on the frame 16 with its control switch 25 mounted on one of the uprights 18. The motor 24 is provided with a speed reducer 26 whose driven shaft 27 has a sprocket 28 connected to the sprocket 29 on the shaft 22B by a chain 30. The shaft 22B is also provided with vertically spaced sprockets 31 and 32, the sprocket 31 being connected to a sprocket 33 on the shaft 22A by a chain 34 and the sprocket 32 being connected to a sprocket 35 on the shaft 22C by a chain 36. Adjustable chain tensioning idlers 37 are mounted on the support 20, one for the chain 34 and one for the chain 36. By these or equivalent means, the hollow shafts are rotated at a desired rate while groups of pans 11 are slid into or removed from concentric positions relative thereto.

A manifold 38 on the frame 16 is provided with an inlet conduit 39 from a suitable source of air under pressure and controlled by a manually operable shut-off valve 40 and an electrically operated, normally closed valve 41. The manifold 38 also has three conduits 42, each in communication with and supporting the upper ends of a swivel joint 43, one swivel joint for each hollow shaft and connected thereto by a rubber sleeve 44 thereby avoiding the necessity of precise vertical alinement of the swivel joints and the hollow shafts.

A conduit 45 is in communication with the interior of the end of each hollow shaft and each conduit 45 extends radially above an appropriate one of the plates 23 and has radially spaced nozzles 46 and 47 attached thereto and open downwardly therethrough. The nozzle 46 is located to direct air downwardly against the seam between the cake 10 and the post 12 while the nozzle 47 is located to direct air downwardly against the seam between the cake 10 and the pan wall 13.

While it is desired that the hollow shafts be continuously rotating throughout the cake removal period, it is necessary to control the air so that it will not discharge against a cake 10 until the cake is properly positioned. For that reason, the circuit 48 to the electrically opened valve 41 includes a pair of switches 49 attached to the member 17 and arranged in series, the switches being normally open and having plungers 50 extending forwardly through the support 17 to be engaged to close the switches by the leading side of the pan frame 14 when it is seated against the support 17.

In practice, the pressure of the air (gauge pressure) is in the order of one hundred twenty-five pounds with the nozzle orifices being in the order of 3/16 inch. The distance between the nozzle and the pans is preferably about one inch, and the plates 23 are rotated in a range of from approximately 15–35 r.p.m. We have found that, with the above construction, cakes, after being allowed to cool, may be quickly freed from their pans without injury thereto. In practice, a cake becomes freed from the bottom of its pan and is lifted therefrom and held against the undersurface of overlying rotating plate 23 which is so closely spaced that the cakes are not damaged by their being lifted in zones where the seam-freeing jets are applied. The combined action of the air and the rotating plate ensures cake release.

It will be apparent that apparatus in accordance with the invention are well adapted to meet all the requirements of a bakery as to the removal of baked products from their pans.

We claim:

1. In apparatus for releasing a bakery product from the pan in which it was baked, a first support, air jet establishing means carried by said support, a source of air under pressure in communication with said jet establishing means, a second support, said second support being for the pan and positioning the pan with the seam defined by the junction of the side of the product and the side of the pan in the path of air delivered through said jet establishing means, and means connected to one of said supports and operable to turn it to effect relative movement between said jet establishing means and said pan for substantially the full length of said seam, the product being sufficiently close to the jet establishing means and the pressure of the air delivered therethrough being such that the seam is opened on such relative movement and the product freed from the bottom of said pan at least when the full length of said seam has been exposed to the jet establishing means.

2. The apparatus of claim 1 in which the air pressure is operative to lift the product relative to its pan.

3. The apparatus of claim 1 in which the air pressure is operative to lift the product relative to its pan and the apparatus includes means spaced from the pan to permit the cake to move but a short distance away from the pan.

4. In apparatus for releasing a bakery product from a circular pan in which it was baked, a first support, air jet establishing means carried by said support, a source of air under pressure in communication with said jet establishing means, a second support, said second support being for the pan and positioning the pan with the seam defined by the junction of the side of the product and the side of the pan in the path of air delivered through said jet establishing means, and means connected to one of said supports and operable to rotate it to effect relative circular movement between said jet establishing means and said seam for substantially the full length of said seam, the product being sufficiently close to the jet establishing means and the pressure of the air delivered therethrough being such that the seam is opened on such relative movement and the product freed from the bottom of said pan at least when the full length of said seam has been exposed to the jet establishing means.

5. The apparatus of claim 4 in which the support for the air jet establishing means is the rotatable support.

6. The apparatus of claim 4 in which the support for the air jet establishing means is the rotatable support and includes a portion spaced from the pan to permit the cake to move but a short distance away from the pan and the air jet establishing means opens downwardly through the support portion.

7. In apparatus for releasing a bakery product from the pan in which it was baked, the pan being circular and having a central post, a first support, air jet establishing means carried by said support and including a pair of spaced nozzles, a source of air under pressure in communication with said jet establishing means, a second support, said second support being for the pan and positioning the pan with the seam defined by the junction of the side of the product and the side of the pan in the path of air delivered through one of said nozzles and the seam defined by the junction of the product and said post in the path of air delivered through the other of said nozzles, and means connected to one of said supports and operable to rotate it to effect relative movement between said nozzles and said pan for substantially the full length of said seams, the product being sufficiently close to the nozzles and the pressure of the air delivered therethrough being such that the seams are opened on such relative movement and the product freed from the bottom of said pan at least when the full length of said seams have been exposed to air from said nozzles.

8. The apparatus of claim 7 in which the support for the air jet establishing means is the rotatable support and the position of the pan established by the other support is concentric with respect thereto.

9. The apparatus of claim 7 in which the support for the air jet establishing means is the rotatable support, the position of the pan established by the other support is concentric with respect thereto, and the rotatable support includes a portion to which the two nozzles are attached in radially spaced relationship and the support position is spaced from the pan to permit the cake to move but a short distance away from the pan.

10. In apparatus for releasing a bakery product from the circular pan in which it was baked, a rotatable support, air jet establishing means carried by said support, means continuously rotating said support, a source of air under pressure in communication with said jet establishing means and including a valve control, a second support, said second support being for the pan and having a predetermined position in which said pan is concentric with respect to said rotatable support and with the seam defined by the junction of the side of the product and the side of the pan in the path of air delivered through said jet establishing means as said rotatable support rotates, the product being sufficiently close to the jet establishing means and the pressure of the air delivered therethrough being such that the seam is opened on such rotary movement and the product freed from the bottom of said pan at least when the full length of said seam has been exposed to the jet establishing means, said valve control having a normal position in which the air source is closed with respect to said air jet establishing means and an operative position established when said second support is in its predetermined position.

11. The apparatus of claim 10 in which the rotatable support is in the form of a circular plate having a smooth undersurface, the diameter of the plate being approximately that of the pan, the jet establishing means opening downwardly through the plate, and the plate being spaced a short distance above the pan to limit vertical movement of the cake.

12. In apparatus for releasing bakery products from an interconnected set of circular pans in which the products were baked, rotatable supports, one for each pan of said set, air jet establishing means carried by each of said supports, a source of air under pressure including conduits in communication with each of said jet establishing means, support rotating means operatively connected to said supports, a second support for said set of pans, said second support providing a predetermined position for said set of pans in which each pan is positioned concentrically with respect to an appropriate one of said supports with the seam defined by the junction of the side of each product and the side of its pan in the path of air delivered through said jet establishing means of the appropriate rotatable support, the product in each pan being sufficiently close to the jet establishing means of each rotatable support and the pressure of the air delivered therethrough being such that each seam is opened on such rotary movement with each product being freed from the bottom of its pan at least when the full length of said seam has been exposed to the opening action of the air delivered by the jet establishing means.

13. The apparatus of claim 12 and a common drive for the rotatable supports, said drive including hollow shafts that are parts of the air delivery conduits and are journalled between their ends, a swivel joint for each shaft in communication with the source, and a flexible, airtight sleeve connecting each joint to the upper end of the appropriate hollow shaft.

14. In apparatus for releasing a bakery product from a circular pan in which it was baked, a first support including a rotatable plate, air jet establishing means carried by said plate, a source of air under pressure in communication with said jet establishing means, a second support, said second support being for the pan and positioning the pan with the seam defined by the junction of the side of the product and the side of the pan in the path of air delivered through said jet establishing means, and means connected to said first support and operable to rotate it to effect relative circular movement between said jet establishing means and said seam for substantially the full length of said seam, the product being sufficiently close to the plate and the jet establishing means and the pressure of the air delivered through the jet establishing means being such that the seam is opened on such relative movement and the product freed from the bottom of said pan and raised against said rotating plate at least when the full length of said seam has been exposed to the jet establishing means.

15. An apparatus for releasing a bakery product from a pan comprising, a first support, an air jet establishing means carried by said support, a source of air under pressure in communication with said jet establishing means, a second support, said second support being operable to support the pan with a portion of the seam defined by the intersection of the side of the product and the side of the pan in the path of an air stream issuing from said jet establishing means, and motorized drive means operable to generate a multidirectional movement of one of said supports relative to the others so as to expose substantially the full length of said seam around the side of the product to an air stream issuing from said air jet establishing means, the products being sufficiently close to the jet establishing means and the pressure of the air delivered therethrough being such that the seam is opened on such relative movement and the products freed from the bottom of said pan after substantially the full length of said seam has been exposed to the air stream issuing from the jet establishing means.

16. An apparatus for releasing a bakery product from a pan comprising, a first support, an air jet establishing means carried by said support, a source of air under pressure in communication with said jet establishing means, a second support, said second support being operable to support the pan with a portion of the seam defined by the intersection of the side of the product and the side of the pan in the path of an air stream issuing from said jet establishing means, and motorized drive means operable to generate a multi-directional relative movement of said supports so as to expose substantially the full length of said seam around the side of the product to an air stream issuing from said air jet establishing means the products being sufficiently close to the jet establishing means and the pressure of the air delivered therethrough being such that the seam is opened on such relative movement and the products freed from the bottom of said pan after substantially the full length of said seam has been exposed to the air stream issuing from the jet establishing means.

17. An apparatus for releasing a bakery product from a pan comprising, a first support, an air jet establishing means carried by said support, a source of air under pressure in communication with said jet establishing means, a second support, said second support being operable to support the pan with a portion of the seam defined by the intersection of the side of the product and the side of the pan in the path of an air stream issuing from said jet establishing means, and motorized drive means operable to generate a continuous path, multi-directional, relative movement between said supports so as to expose substantially the full length of said seam around the side of the product to an air stream issuing from said air jet establishing means, the products being sufficiently close to the jet establishing means and the pressure of the air delivered therethrough being such that the seam is opened on such relative movement and the products freed from the bottom of said pan after substantially the full length of said seam has been exposed to the air stream issuing from the jet establishing means.

References Cited by the Examiner
UNITED STATES PATENTS

| | | | |
|---|---|---|---|
| 2,271,937 | 2/1942 | Engels | 214—310 |
| 2,927,707 | 3/1960 | Reed et al. | 214—309 |
| 2,962,984 | 12/1960 | Noel | 107—57 |
| 3,066,812 | 12/1962 | Stadelman | 214—309 |

HUGO O. SCHULZ, *Primary Examiner.*